(12) United States Patent
Huang et al.

(10) Patent No.: US 11,550,469 B2
(45) Date of Patent: Jan. 10, 2023

(54) DEVICES, METHODS AND SYSTEMS FOR CONTROL OF AN ELECTRONIC DEVICE USING FORCE-BASED GESTURES

(71) Applicants: Da-Yuan Huang, Markham (CA); Wei Li, Markham (CA); Pourang Polad Irani, Winnipeg (CA)

(72) Inventors: Da-Yuan Huang, Markham (CA); Wei Li, Markham (CA); Pourang Polad Irani, Winnipeg (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/183,998

(22) Filed: Feb. 24, 2021

(65) Prior Publication Data
US 2022/0269404 A1 Aug. 25, 2022

(51) Int. Cl.
*G06F 3/04883* (2022.01)
*G06F 3/041* (2006.01)
(Continued)

(52) U.S. Cl.
CPC ......... *G06F 3/04883* (2013.01); *G06F 3/016* (2013.01); *G06F 3/0414* (2013.01);
(Continued)

(58) Field of Classification Search
CPC .... G06F 3/04883; G06F 3/016; G06F 3/0414; G06F 3/0416; G06F 3/0483;
(Continued)

(56) References Cited

U.S. PATENT DOCUMENTS

| 6,459,424 B1* | 10/2002 | Resman | ................... G09G 3/20 |
| | | | 345/173 |
| 2003/0020687 A1* | 1/2003 | Sowden | .............. G06F 3/03547 |
| | | | 345/157 |

(Continued)

FOREIGN PATENT DOCUMENTS

| CN | 102710846 A | 10/2012 |
| CN | 105759957 A | 7/2016 |

OTHER PUBLICATIONS

Antonio Gomes and Roel Vertegaal. 2015. PaperFold: Evaluating Shape Changes for Viewport Transformations in Foldable Thin-Film Display Devices. In Proceedings of the Ninth International Conference on Tangible, Embedded, and Embodied Interaction (TEI '15). Association for Computing Machinery, New York, NY, USA, 153-160. DOI:https://doi.org/10.1145/2677199.2680572.

(Continued)

*Primary Examiner* — Richard J Hong

(57) ABSTRACT

Devices, methods and systems for controlling an electronic device using force-based gestures are described. Force data from one or more force sensors, representing a force input to the electronic device, is monitored to determine any force data exceeding a defined first magnitude threshold. In response to determining force data from at least one force sensor exceeding the first magnitude threshold, an edge location or a corner location of the force input is determined. The force input is processed as a force gesture in accordance with the determined edge location or the determined corner location. Haptic feedback is generated concurrently with processing the force gesture.

13 Claims, 7 Drawing Sheets

(51) Int. Cl.
  *G06F 3/0483* (2013.01)
  *G06F 3/0485* (2022.01)
  *G06F 3/01* (2006.01)
(52) U.S. Cl.
  CPC .......... *G06F 3/0416* (2013.01); *G06F 3/0483* (2013.01); *G06F 3/0485* (2013.01)
(58) Field of Classification Search
  CPC ...... G06F 3/0485; G06F 3/0488; G06F 3/017; G06F 3/03547; G06F 15/0291; G06F 1/1643; G06F 3/0481; G10L 13/033; H04M 1/22; G09G 3/20; H04N 21/44008
  See application file for complete search history.

(56) References Cited

U.S. PATENT DOCUMENTS

| | | | | |
|---|---|---|---|---|
| 2009/0284481 | A1* | 11/2009 | Zhuang | H04M 1/22 345/173 |
| 2010/0175018 | A1* | 7/2010 | Petschnigg | G06F 3/017 715/776 |
| 2011/0050594 | A1* | 3/2011 | Kim | G10L 13/033 345/173 |
| 2011/0141052 | A1 | 6/2011 | Bernstein et al. | |
| 2011/0209093 | A1* | 8/2011 | Hinckley | G06F 3/04883 715/834 |
| 2012/0028577 | A1* | 2/2012 | Rodriguez | H04N 21/44008 340/407.1 |
| 2012/0066591 | A1* | 3/2012 | Hackwell | G06F 3/0483 715/702 |
| 2012/0084704 | A1* | 4/2012 | Lee | G06F 3/0483 715/776 |
| 2012/0240075 | A1* | 9/2012 | Kim | G06F 3/0481 715/776 |
| 2013/0155018 | A1* | 6/2013 | Dagdeviren | G06F 3/03547 345/174 |
| 2013/0229371 | A1* | 9/2013 | Lee | G06F 3/0483 345/173 |
| 2013/0232439 | A1* | 9/2013 | Lee | G06F 3/0483 715/776 |
| 2013/0268847 | A1* | 10/2013 | Kim | G06F 3/0488 715/251 |
| 2013/0268858 | A1* | 10/2013 | Kim | G06F 3/0483 715/716 |
| 2014/0281954 | A1 | 9/2014 | Ullrich et al. | |
| 2014/0289593 | A1* | 9/2014 | Krishnan | G06F 15/0291 715/201 |
| 2015/0091809 | A1* | 4/2015 | Ibargoyen | G06F 1/1643 345/173 |

OTHER PUBLICATIONS

Daniel Gotsch, Xujing Zhang, Jesse Burstyn, and Roel Vertegaal. 2016. HoloFlex: A Flexible Holographic Smartphone with Bend Input. In Proceedings of the 2016 CHI Conference Extended Abstracts on Human Factors in Computing Systems (CHI EA '16). Association for Computing Machinery, New York, NY, USA, 3675-3678. DOI:https://doi.org/10.1145/2851581.2890258.

Aneesh Tarun, Peng Wang, Paul Strohmeier, Audrey Girouard, Derek Reilly, and Roel Vertegaal. 2013. PaperTab: tablets as thin and flexible as paper. In CHI '13 Extended Abstracts on Human Factors in Computing Systems (CHI EA '13). Association for Computing Machinery, New York, NY, USA, 2881-2882. DOI:https://doi.org/10.1145/2468356.2479559.

Mengting Huang, Kazuyuki Fujita, Kazuki Takashima, Taichi Tsuchida, Hiroyuki Manabe, and Yoshifumi Kitamura. 2019. ShearSheet: Low-Cost Shear Force Input with Elastic Feedback for Augmenting Touch Interaction. In Proceedings of the 2019 ACM International Conference on Interactive Surfaces and Spaces (ISS '19). Association for Computing Machinery, New York, NY, USA, 77-87. DOI:https://doi.org/10.1145/3343055.3359717.

Seongkook Heo and Geehyuk Lee. 2011. Force gestures: augmenting touch screen gestures with normal and tangential forces. In Proceedings of the 24th annual ACM symposium on User interface software and technology (UIST '11). Association for Computing Machinery, New York, NY, USA, 621-626. DOI:https://doi.org/10.1145/2047196.2047278.

Seongkook Heo and Geehyuk Lee. 2013. Indirect shear force estimation for multi-point shear force operations. In Proceedings of the SIGCHI Conference on Human Factors in Computing Systems (CHI '13). Association for Computing Machinery, New York, NY, USA, 281-284. DOI:https://doi.org/10.1145/2470654.2470693.

https://www.amazon.com/Amazon-Kindle-Voyage-6-Inch-4GB-eReader/dp/B00IOY8XWQ.

Paul Strohmeier, Jesse Burstyn, Juan Pablo Carrascal, Vincent Levesque, and Roel Vertegaal. 2016. ReFlex: A Flexible Smartphone with Active Haptic Feedback for Bend Input. In Proceedings of the TEI '16: Tenth International Conference on Tangible, Embedded, and Embodied Interaction (TEI '16) Association for Computing Machinery, New York, NY, USA, 185-192. DOI:https://doi.org/10.1145/2839462.2839494.

Paul Strohmeier, Sebastian Boring, and Kasper Hornbæk. 2018. From Pulse Trains to "Coloring with Vibrations": Motion Mappings for Mid-Air Haptic Textures. In Proceedings of the 2018 CHI Conference on Human Factors in Computing Systems (CHI '18). Association for Computing Machinery, New York, NY, USA, Paper 65, 1-13. DOI:https://doi.org/10.1145/3173574.3173639.

Paul Strohmeier and Kasper Hornbæk. 2017. Generating Haptic Textures with a Vibrotactile Actuator. In Proceedings of the 2017 CHI Conference on Human Factors in Computing Systems (CHI '17). Association for Computing Machinery, New York, NY, USA, 4994-5005. DOI:https://doi.org/10.1145/3025453.3025812.

Seongkook Heo, Jaeyeon Lee, and Daniel Wigdor. 2019. PseudoBend: Producing Haptic Illusions of Stretching, Bending, and Twisting Using Grain Vibrations. In Proceedings of the 32nd Annual ACM Symposium on User Interface Software and Technology (UIST '19). Association for Computing Machinery, New York, NY, USA, 803-813. DOI:https://doi.org/10.1145/3332165.3347941.

\* cited by examiner

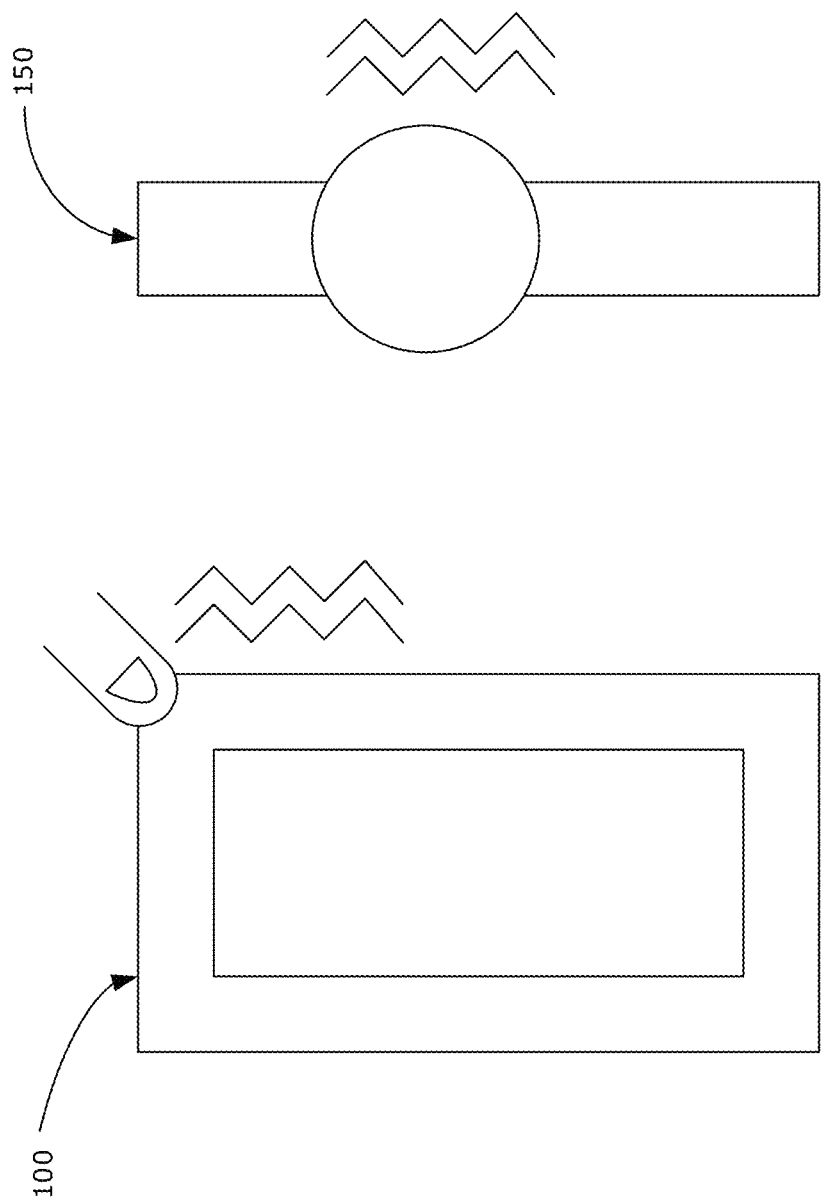

DEVICES, METHODS AND SYSTEMS FOR CONTROL OF AN ELECTRONIC DEVICE USING FORCE-BASED GESTURES

FIELD

The present disclosure relates to devices, methods and systems for controlling an electronic device using force-based gestures, in particular devices, methods and systems for controlling an electronic device having a rigid display using force-based gestures.

BACKGROUND

Electronic reader devices (also referred to as e-readers or e-books) are commonly used to enable users to read a book in a digital or electronic format. With current display technology, electronic reader devices are able to provide a viewing experience that mimics non-electronic reading (e.g., using an e-ink display that better mimics paper).

However, actions that a user may commonly use when reading a physical (i.e., non-electronic) book, such as page folding or page flipping, are typically translated to button pressing when using an electronic reader device. Further, when a user provides input (e.g., presses a button) to perform such actions, there is a degradation of the reading experience on the electronic reader device, compared to reading physical books.

Some existing electronic devices with flexible or foldable displays may allow for user interactions that are better able to simulate the way a user typically interacts with a physical book (e.g., folding, bending or stacking actions). However, flexible or foldable displays are typically limited to specialized devices and are not found in most common electronic devices currently on the market.

Further, other applications (e.g., video playback applications, browser applications, etc.) on an electronic device also do not support user interactions that mimic physical interactions.

Accordingly, it would be useful to provide methods and systems that enable user interactions with an electronic device that better mimic physical interactions, without necessarily requiring the electronic device to have a flexible or foldable display.

SUMMARY

In various examples, the present disclosure describes an electronic device, which may be a dedicated electronic reader device or a general purpose electronic device, that is capable of accepting force-based gestures as control inputs. The disclosed device also is capable of generating haptic output. In particular, the disclosed device includes force sensors that enable detection of force input at peripheral locations of the device.

In various examples, the present disclosure also describes methods for controlling operation of an electronic device, which may be a dedicated electronic reader device or a general purpose electronic device. In particular, the present disclosure describes methods for performing operations that may be used to navigate an electronic book, including turning a page, bending a page, and flipping multiple pages, in response to inputs that can include force inputs. The present disclosure also describes methods for performing operations that may be used to control video playback, navigating a displayed menu, and/or navigating a displayed document or webpage, among other applications. Further, the present disclosure describes methods for generating haptic output when such operations are performed.

The examples disclosed herein may enable user interaction with an electronic device that more closely mimics user interactions, such as user interactions with a physical book. The disclosed examples may enable a user to use gestures that are commonly used to interact with a physical book, to interact with the electronic device. This may provide a more intuitive and efficient user experience. Further, the disclosed examples may generate haptic output that causes haptic illusion in the user, to mimic the haptic experience of interacting with a physical book. The result is that an additional feedback modality is provided to the user, to enable the user to interact with the electronic in a way that better mimics a physical interaction.

Although the user interactions may be motivated by physical interactions with a physical book, the present disclosure is not limited to applications in the context of an electronic book. For example, force-based gestures may be used for interacting with an electronic device in other contexts (e.g., controlling video playback, navigating through a browser, opening or closing a menu, etc.). Haptic feedback may also be generated in these other contexts, to provide a user with non-visual confirmation of a user input for example. Thus, the present disclosure describes examples that provide an additional force-based input modality and an additional haptics-based feedback modality, which may enable more intuitive or efficient user interactions on an electronic device.

In some examples, the present disclosure describes a method for processing gesture input at an electronic device. The method includes: monitoring force data from one or more force sensors to determine any force data exceeding a defined first magnitude threshold, the force data representing a force input to the electronic device; in response to determining force data from at least one force sensor exceeding the first magnitude threshold, determining an edge location or a corner location of the force input; processing the force input as a force gesture in accordance with the determined edge location or the determined corner location; and generating haptic feedback concurrently with processing the force gesture.

In any of the preceding examples, the method may include: in response to determining absence of any force data exceeding the first magnitude threshold, monitoring touch data to determine a sliding touch input to the electronic device; processing the sliding touch input as a sliding gesture; and generating the haptic feedback concurrently with processing the sliding gesture.

In any of the preceding examples, the method may include: determining, from the monitored force data, shear force input exceeding a defined shear threshold; and processing the sliding gesture based on the shear force input.

In any of the preceding examples, the edge location of the force input may be determined, and the force input may be processed as a flipping gesture.

In any of the preceding examples, the force input may be processed as a flipping gesture for a time duration of the force input, and the haptic feedback may be generated for the time duration.

In any of the preceding examples, the corner location of the force input may be determined, and the force input may be processed as a folding gesture.

In any of the preceding examples, the haptic feedback may be generated in accordance with a calculated magnitude of the force data.

In any of the preceding examples, the haptic feedback may be generated using a first set of parameters in response to determining that the force data exceeds the first magnitude threshold, and the haptic feedback may be generated using a second set of parameters in response to determining that the force data exceeds a higher second magnitude threshold.

In any of the preceding examples, the electronic device may be executing an electronic reader application, and the force gesture may be processed as input to create or remove a bookmark when the corner location is determined; or the force gesture may be processed as input to navigate forward or backward through one or more pages when the edge location is determined.

In any of the preceding examples, the electronic device may be executing a playback application, and the force gesture may be processed as input to fast forward or rewind the playback when the edge location is determined.

In any of the preceding examples, the electronic device may be executing a viewer application, and the force gesture may be processed as input to scroll up or down when the edge location is determined.

In some examples, the present disclosure describes an electronic device including: a processing unit coupled to a memory storing machine-executable instructions thereon. The instructions, when executed by the processing unit, causes the electronic device to perform any of the methods described above.

In some examples, the present disclosure describes a non-transitory computer-readable medium having machine-executable instructions stored thereon. The instructions, when executed by a processing unit of an electronic device, cause the electronic device to perform any of the methods described above.

BRIEF DESCRIPTION OF THE DRAWINGS

Reference will now be made, by way of example, to the accompanying drawings which show example embodiments of the present application, and in which:

FIG. 7 illustrates an example electronic device generating haptic feedback in cooperation with a wearable device, in accordance with examples of the present disclosure.

Similar reference numerals may have been used in different figures to denote similar components.

DESCRIPTION OF EXAMPLE EMBODIMENTS

Figure 1:
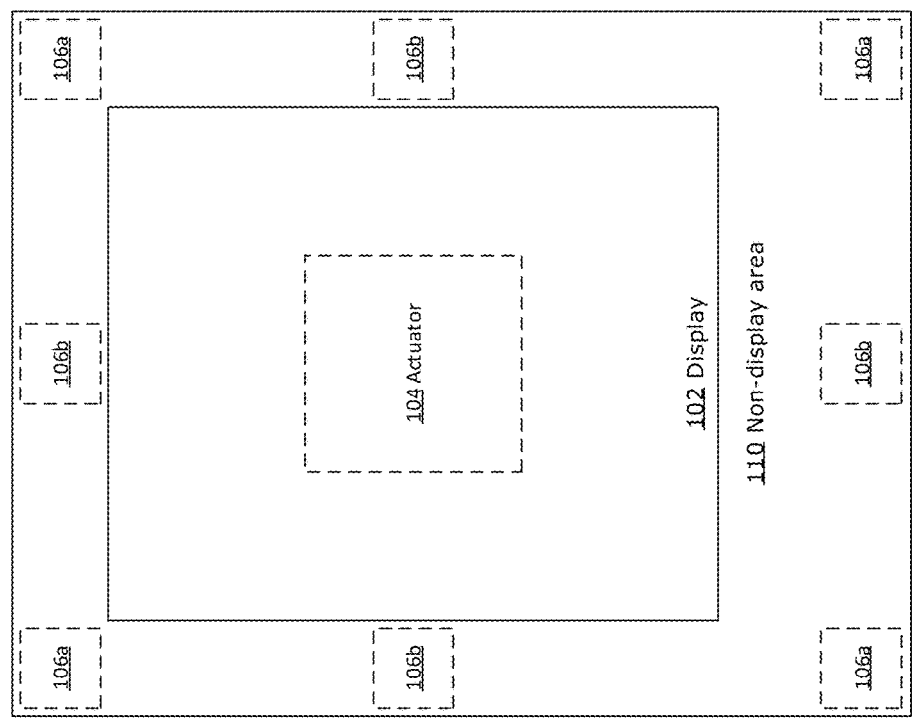
FIG. 1 is a block diagram illustrating an electronic device, in accordance with examples of the present disclosure.
Figure 1:

In various examples, the present disclosure describes methods and systems enabling force-based gestures for controlling an electronic device. The electronic device may be any mobile and/or handheld electronic device such as a mobile communication device (e.g., smartphone), a tablet device, or a laptop device, among others. The electronic device may be a specialized electronic reader device (e.g., having an e-ink display rather than a backlit display) capable of executing a software application for viewing an electronic book (i.e., a book in a digital format), in some examples.

Although the present disclosure describes some examples in the context of user interactions with an electronic book, it should be understood that these are only exemplary and are not intended to be limiting. Examples of the present disclosure may be applicable in other contexts, as discussed further below.

To assist in understanding the present disclosure, some existing design concerns for electronic reader devices are first discussed.

As previously mentioned, the use of flexible displays can enable user interactions that more closely mimic the way a user interacts with a physical book, including folding, bending, or stacking actions. Some devices with flexible displays can simulate flipping through the pages of an electronic book, when a user bends the display, and can also generate vibrotactile feedback. However, flexible displays are found on a minority of electronic devices, and most common electronic devices, including most common electronic reader devices, have rigid displays.

There have been some studies that consider using shear force as an input modality for touch interfaces. However, there has not been any consideration for how such input might be translated to user interactions for reading an electronic book on an electronic reader device. Further, the problem remains that the user is not provided with any haptic feedback.

Some existing commercial electronic reader devices, such as the Kindle Voyage™, generate vibrotactile feedback in response to user input (e.g., when the user presses a page-turning button). However, such user interaction is not coherent with the user's daily experiences of interacting with a physical book.

In various examples, the present disclosure describes an electronic device, and methods implemented thereon, that enable user interactions via force inputs. In particular, user interactions may include force-based gesture inputs, such as sliding, bending, and flipping gestures. Further, the disclosed devices and methods enable haptic feedback (e.g., vibrotactile feedback) to be outputted to a user together with performing operations in response to the user input.

In the context of user interactions with an electronic book (e.g., on a dedicated electronic reader device), user interactions may include gesture inputs for turning a page of the book, folding or unfolding a page corner of the book, or flipping multiple pages of the book, for example. The haptic feedback may provide a user with a haptic experience that mimics turning a page, folding a page, or flipping multiple pages on a physical book. The haptic feedback may cause the user to experience a haptic illusion. Haptic illusions are perceptual illusions that cause people to experience forces, frictions, or shape deformations of an object that differ from the actual situation. For example, haptic feedback that is generated when a user performs a folding gesture may cause the user to experience a haptic illusion that the rigid electronic device is being folded.

Such user interactions may be adapted for applications other than navigating an electronic book, and may help to provide a more intuitive user experience in such other applications.

FIG. 1 shows an example electronic device 100, in accordance with some embodiments of the present disclosure. Although an example embodiment of the electronic device 100 is shown and discussed below, other embodiments may be used to implement examples disclosed herein, which may include components different from those shown. The electronic device 100 may be any mobile or handheld electronic device, such as a tablet device, a laptop device, or a smartphone, for example. The electronic device 100 may be a dedicated electronic reader device in some examples.

In this simplified diagram, optional input and output devices (e.g., a keyboard, mouse, mechanical buttons, camera, speaker, lights, etc.) that may be coupled to or part of the electronic device 100 are not shown.

The electronic device 100 includes a display 102 located on a front surface (or viewing surface) of the electronic device 100. Areas of the front surface of the electronic device 100 outside of the display 102 may be referred to as the non-display area 110 of the electronic device 100, or may be referred to as the bezel. The electronic device 100 also includes an actuator 104. The actuator may be hidden from the user (as indicated by dashed lines in FIG. 1) by the outer shell of the electronic device 100. The actuator 104 may be any suitable tactile motor (also referred to as a tactor) capable of generating haptic feedback, such as vibrations. The actuator 104 may be capable of generating haptic feedback using a range of possible parameters (e.g., capable of generating vibrations using a range of possible frequencies) For example, the actuator 104 may be a high resolution vibrotactile device capable of high bandwidth (e.g., 50-500 Hz) vibrations. Although FIG. 1 illustrates a single actuator 104 located under the display 102, it should be understood that one or more actuators 104 may be incorporated into the electronic device 100 in various ways. For example, a plurality of actuators 104 may be located at different locations on the electronic device 100, to enable more nuanced haptic feedback (e.g., vibrations may be generated at different locations of the electronic device 100 to generate different haptic illusions). It should be understood that the present disclosure is not intended to be limited to the specific actuator(s) 104 and arrangement thereof that are described.

The electronic device 100 in this example includes one or more force sensors 106a that are located near respective corners of the electronic device 100. The force sensor(s) 106a may be referred to as corner force sensor(s) 106a. The electronic device 100 in this example also includes one or more force sensors 106b that are located near respective edges of the electronic device 100. The force sensor(s) 106b may be referred to as edge force sensor(s) 106b. The edge force sensor(s) 106b may be located at or near the midpoint along each respective edge of the electronic device 100. The corner force sensor(s) 106a and the edge force sensor(s) 106b may be generally referred to as a force sensor 106. The force sensor(s) 106 may be hidden from the user (as indicated by dashed lines in FIG. 1) by the outer shell of the electronic device 100. The electronic device 100 may, in some examples, include only corner force sensor(s) 106a or may include only edge force sensor(s) 106b. In some examples, the electronic device 100 may include only a single force sensor 106, which may be a single corner force sensor 106a or a single edge force sensor 106b. In some examples, the electronic device 100 may include one or more force sensors 106 at locations other than a corner or an edge. For example, the electronic device 100 may include a single centrally-located force sensor 106 that is capable of detected forces applied at corners and/or edges of the electronic device 100. Generally, any arrangement of one or more force sensors 106 may be used in the electronic device 100, provided the one or more force sensors 106 is(are) capable of detecting force-based input gestures as discussed further below. It should be understood that the present disclosure is not intended to be limited to the specific force sensor(s) 106 and arrangement thereof that are described.

The force sensor(s) 106 may each be any sensor capable of detecting applied force. For example, the force sensor(s) 106 may each be a three-axis strain gauge (i.e., capable of detecting applied force in three orthogonal directions, typically referred to as the x-axis, y-axis (which define the plane of the force sensor 106) and z-axis (which is normal to the plane of the force sensor 106)). Forces that are applied in the plane of the force sensor 106 may be referred to as shear forces (or horizontal forces), and forces that are applied normal to the plane of the force sensor 106 may be referred to as normal forces (or vertical forces). It should be noted that the force sensor(s) 106 may also be capable of detected applied torques in addition to shear and normal forces.

In some examples, at least one force sensor 106 may be provided together with at least one actuator 104 in a multi-layered haptic module. The haptic module may include one force sensor 106 (e.g., a multi-axis strain gauge), one actuator 104 (e.g., a high-resolution tactor) with a buffer layer therebetween. The buffer layer may serve to prevent the force sensor 106 from erroneously detecting the haptic output of the actuator 104 as an applied force. The haptic module may enable the force sensor 106 and the actuator 104 to be located at approximately the same location in the electronic device 100, which may enable the electronic device 100 to generate haptic feedback corresponding to the location of a detected force gesture, as discussed further below. In some examples, each force sensor 106 may be provided together with a corresponding actuator 104 in a haptic module, in the corner and edge locations, and the centrally-located actuator 104 may or may not be omitted.

The force sensor(s) 106 and actuator(s) 104 (whether or not they are packaged together in a haptic module) may be relatively small-sized and lightweight, and may have little or no impact on the weight and size of the electronic device 100.

The electronic device 100 may also include other sensors, such as touch sensors (not shown in FIG. 1), which may be integrated with the display 102 (e.g., a touch-sensitive display). The electronic device 100 may also include touch sensors or other input devices in the non-display area 110 of the electronic device 100.

Figure 2:
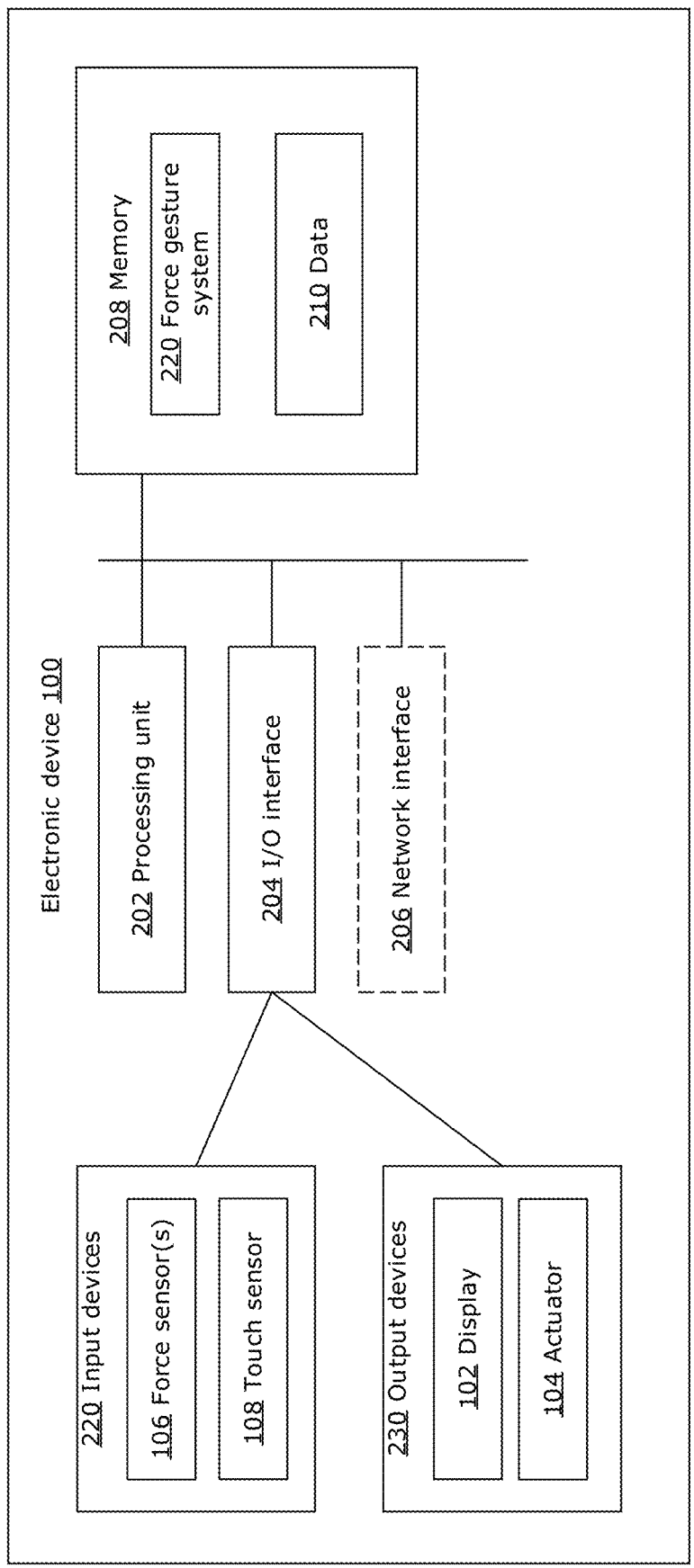
FIG. 2 is a block diagram illustrating some components of the electronic device of FIG. 1.

FIG. 2 is a block diagram showing some components of the electronic device 100. Although FIG. 2 shows a single instance of each component, there may be multiple instances of each component shown.

The electronic device 100 includes at least one processing unit 202, such as a processor, a microprocessor, an application-specific integrated circuit (ASIC), a field-programmable gate array (FPGA), a dedicated logic circuitry, a dedicated artificial intelligence processor unit, or combinations thereof. The electronic device 100 also includes at least one input/output (I/O) interface 204, which interfaces with input devices 220 (such as the force sensor(s) 106 and a touch sensor 108) and output devices 230 (such as the display 102 and the actuator 104). The electronic device 100 may include or may couple to other input devices (e.g., mechanical buttons, microphone, keyboard, etc.) and other output devices (e.g., speaker, lights, etc.).

The force sensor(s) 106 each generates force data in response to detecting an applied force. The value of the generated force data may be proportional to the magnitude of the applied force, for example. In some examples, the I/O interface 204 may buffer the force data generated by the force sensor(s) 106 and provide the force data to the processing unit 202 to be processed in real-time or near real-time (e.g., within 10 ms). The I/O interface 204 may perform preprocessing operations on the force data, for example normalization, filtering, denoising, etc., prior to providing the force data to the processing unit 202. In examples where there is a plurality of force sensors 106, the force data generated by each force sensor 106 may be attributable to each force sensor 106, to enable the processing unit 202 to perform certain operations depending on which force sensor 106 detected an applied force (as discussed further below).

The touch sensor 108 generates touch data in response to detecting a touch, for example a user's finger touching a touchscreen display 102. The touch data 108 may also be provided to the processing unit 202, via the I/O interface 204, in real-time or near real-time. The I/O interface 204 may perform preprocessing operations on the touch data, for example normalization, filtering, denoising, etc., prior to providing the touch data to the processing unit 202.

The actuator 104 is controlled to provide haptic output by control signals from the processing unit 202 (via the I/O interface 204). In examples where there is a plurality of actuators 104, each actuator 104 may be independently controlled to provide independent haptic output. For example, each actuator 104 may be controlled to provide a specific vibration (e.g., having a specific vibration frequency and/or vibration magnitude). In some examples, a plurality of actuators 104 may be controlled together as a group.

The electronic device 100 may include an optional network interface 206 for wired or wireless communication with a network (e.g., an intranet, the Internet, a P2P network, a WAN and/or a LAN) or other node. The network interface 206 may include wired links (e.g., Ethernet cable) and/or wireless links (e.g., one or more antennas) for intra-network and/or inter-network communications.

The electronic device 100 includes at least one memory 208, which may include a volatile or non-volatile memory (e.g., a flash memory, a random access memory (RAM), and/or a read-only memory (ROM)). The non-transitory memory 208 may store instructions for execution by the processing unit 202, such as to carry out examples described in the present disclosure. For example, the memory 208 may include instructions for executing a force gesture system 220. In particular, the instructions for the force gesture system 220 may include instructions executable by the processing unit 202 to cause the electronic device 100 to process force data (generated by the force sensor(s) 106) and to control the actuator 104, as discussed further below.

The memory 208 may include other software instructions, such as for implementing an operating system and other applications/functions. The memory 208 may also include data 210, such as electronic book files or video content files that may be provided as output via the display 102.

In some examples, the electronic device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the electronic device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the electronic device 100 may communicate with each other via a bus, for example.

To help in understanding the present disclosure, a discussion of gestures is first provided. In the present disclosure, three types of force-based gestures are described, which will be referred to as a sliding gesture, a folding gesture and a flipping gesture. It should be understood that although these gestures are referred to as "sliding", "folding" and "flipping" gestures, the user interactions that are supported by these gestures are not limited to sliding, folding and flipping interactions.

Figure 3A:
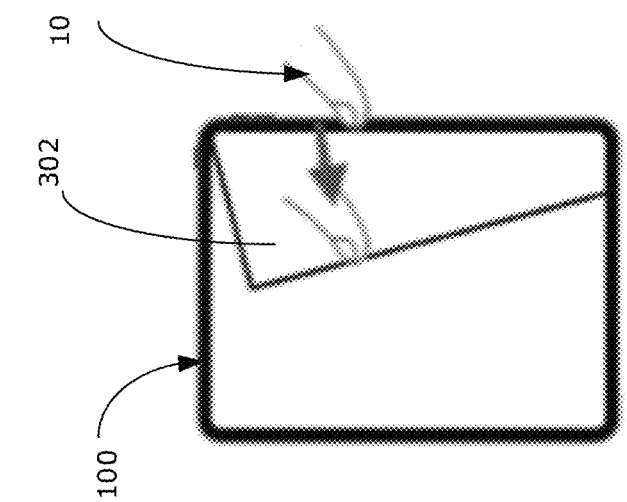
FIGS. 3A-3C illustrate some example force-based gestures that may be used to control an electronic device, in accordance with examples of the present disclosure.

FIG. 3A illustrates an example of a sliding gesture being performed by a user 10 on the electronic device 100, and an accompanying animation that may be displayed by the electronic device 100. As indicated by an arrow in FIG. 3A, the sliding gesture may be performed by the user 10 sliding a finger over the front surface of the electronic device 100. The sliding gesture may be detected when a sliding touch input is detected and force input is below a defined normal force threshold. Details for detecting the sliding gesture will be discussed further below. When the sliding gesture is detected in the context of an electronic book (e.g., when the electronic device 100 is executing software for viewing an electronic book), the electronic device 100 may display an animation 302 simulating turning of a page and navigate through the electronic book by one page. The electronic device 100 also generates haptic feedback (e.g., a vibration) indicating the sliding gesture has been detected and processed. The direction of the page turn may depend on the direction of the sliding gesture. For example, when viewing an electronic book written in the English language, a sliding gesture from right to left may cause the electronic device 100 to navigate to the next page in the electronic book (with accompanying animation 302), and a sliding gesture from left to right may cause the electronic device 100 to navigate to the previous page in the electronic book (with accompanying animation 302).

Figure 3B:
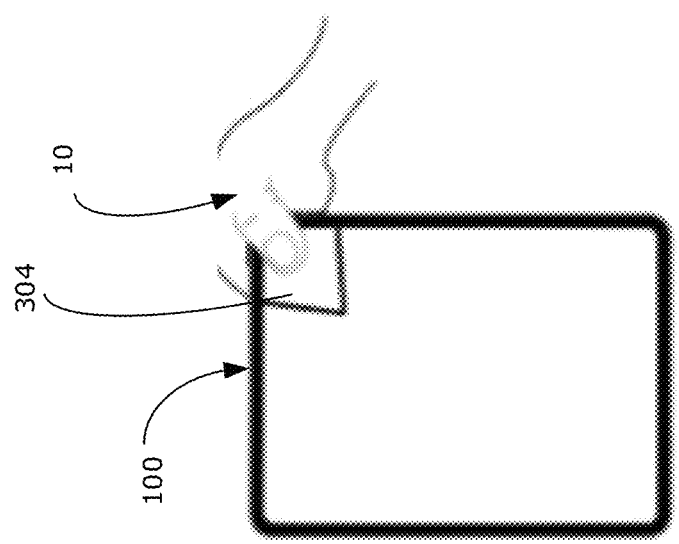

FIG. 3B illustrates an example of a folding gesture being performed by a user 10 on the electronic device 100, and an accompanying animation that may be displayed by the electronic device 100. The folding gesture may be performed by the user 10 applying a force at or near a corner of the electronic device 100. The folding gesture may be detected when force input above a defined normal force threshold is detected by a corner force sensor 106a. Details for detecting the folding gesture will be discussed further below. When the folding gesture is detected in the context of an electronic book (e.g., when the electronic device 100 is executing software for viewing an electronic book), the electronic device 100 may display an animation 304 simulating folding of a page and create a bookmark for the currently displayed page of the electronic book. In some examples, if a bookmark has already been created for the page, the folding gesture may cause the existing bookmark to be removed (and may be accompanied by another animation simulating unfolding of a page). The electronic device 100 also generates haptic feedback (e.g., a vibration) indicating the folding gesture has been detected and processed.

Figure 3C:
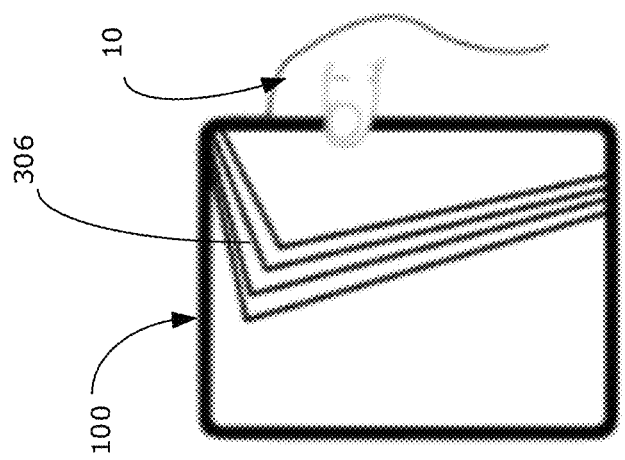

FIG. 3C illustrates an example of a flipping gesture being performed by a user 10 on the electronic device 100, and an accompanying animation that may be displayed by the electronic device 100. The flipping gesture may be performed by the user 10 applying a force at or near an edge of the electronic device 100. The flipping gesture may be detected when force input above a defined normal force threshold is detected by an edge force sensor 106*b*. Details for detecting the flipping gesture will be discussed further below. When the flipping gesture is detected in the context of an electronic device (e.g., when the electronic device 100 is executing software for viewing an electronic book), the electronic device 100 may display an animation 306 simulating flipping of multiple pages and navigate through the electronic book by one or more pages. The direction of the page flipping may depend on the direction of the flipping gesture, which may be detected as a positive or negative normal force, as a positive or negative torque, or as a normal force applied to the left or right edge of the electronic device 100. For example, when viewing an electronic book written in the English language, a flipping gesture detected on the right edge of the electronic device 100 may cause the electronic device 100 to move forward one or more pages of the book (with accompanying animation 306), and a flipping gesture detected on the left edge of the electronic device 100 may cause the electronic device 100 to move backward one or more pages of the book (with accompanying animation 306). The number of pages navigated (forward or backward) may depend on the time duration and/or magnitude of the force input. For example, pages may be navigated forward or backward continuously until the flipping gesture is no longer detected. In another example, pages may be navigated at a first speed if the force input exceeds a first threshold magnitude, and may be navigated at a second faster speed if the force input exceeds a second higher threshold magnitude. The electronic device 100 also generates haptic feedback (e.g., a vibration) indicating the flipping gesture has been detected and processed.

The gestures that have been described above in the context of an electronic book may be similarly used to control navigation through any document or media that is paginated. For example, the gestures illustrated in FIGS. 3A-3C may be used to navigate through pages of a document (e.g., using a word processing application), or through slides of a presentation (e.g., using a presentation application), among other possibilities.

Figure 4:
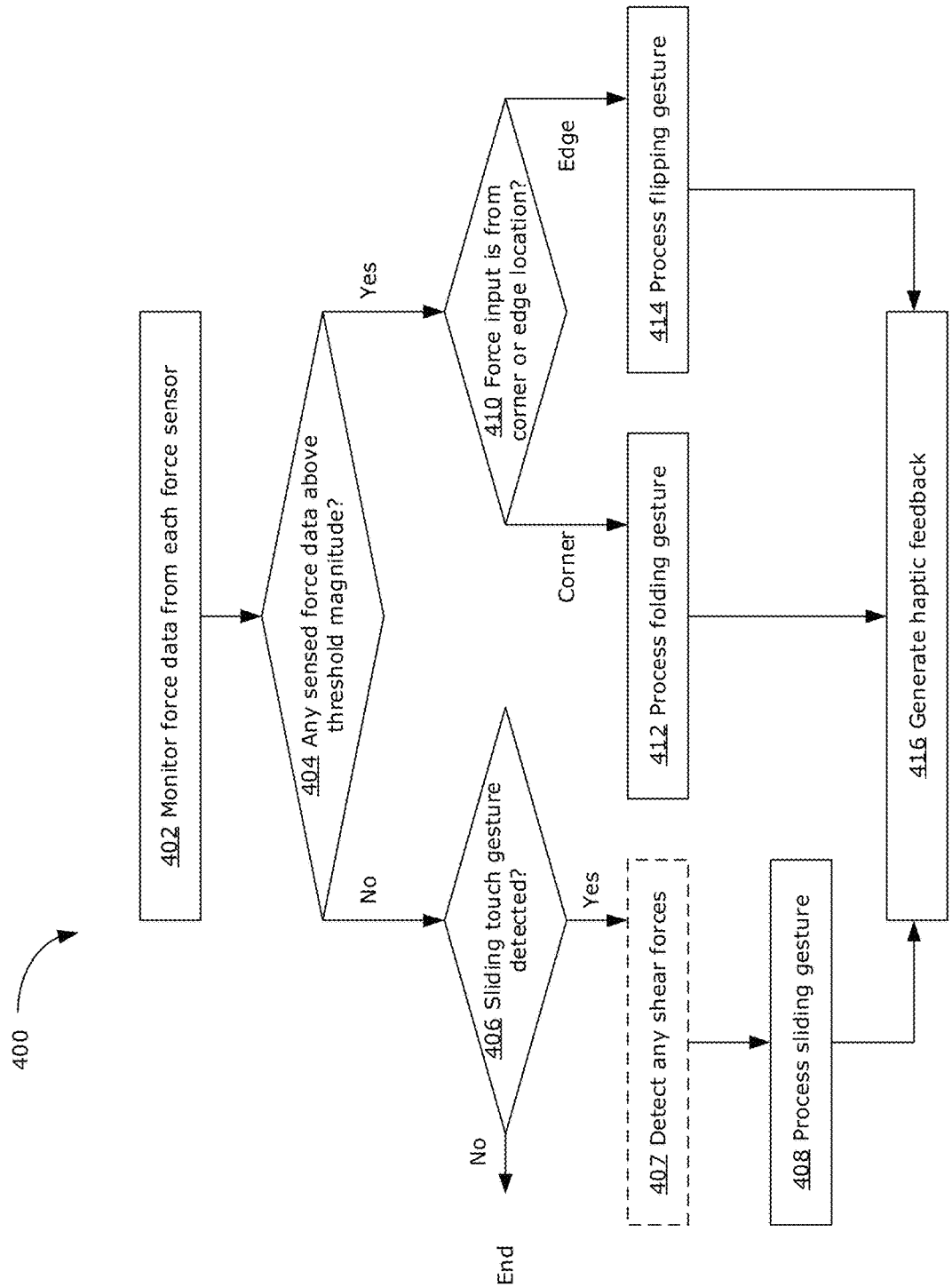
FIG. 4 is a flowchart illustrating an example method for controlling an electronic device, in accordance with examples of the present disclosure.

FIG. 4 is a flowchart illustrating an example method 400 that may be performed by the electronic device 100. For example, the processing unit 202 of the electronic device 100 may execute instructions in the memory 208 for implementing the force gesture system 220.

At 402, force data from each force sensor 106 is monitored (e.g., via the I/O interface 204). Force data may be generated and monitored continuously in real-time (or near real-time) in response to applied force sensed by each force sensor 106. The force data may indicate, for example, the components of the sensed force in each of the three Cartesian axes (i.e., the x, y and z-axes).

At 404, the magnitude of the total force sensed by each force sensor 106 is calculated to determine whether any sensed force data is above a defined threshold magnitude. For example, the magnitude for the total force sensed by a given force sensor 106 may be calculated using the following equation:

$$|F_{tot}|^2 = |F_x|^2 + |F_y|^2 + |F_z|^2$$

where $|F_{tot}|$ is magnitude of the total force (also referred to as the total force magnitude), and $F_x$, $F_y$ and $F_z$ are the x, y, and z-components of the sensed force, respectively.

The calculated total force magnitude for each force sensor 106 is compared against a defined first magnitude threshold. The first magnitude threshold may be defined to reflect a typical force that is applied by a human finger against the electronic device 100. In some examples, the first magnitude threshold may be defined using a calibration process when a user first activates force gesture capability on the electronic device 100. In some examples, if there are multiple force sensors 106 generating non-zero force data, the total force magnitude may be calculated for the multiple force sensors 106, and the force sensor 106 associated with the largest total force magnitude may be identified, and only the largest total force magnitude may be compared against the defined first magnitude threshold. In examples where there are multiple force sensors 106 generating non-zero force data, only the force data having the largest total force magnitude may be used in the following steps of the method 400 and other force data may be discarded.

If there is no total force magnitude that is above the first magnitude threshold, the method 400 proceeds to step 406.

At 406, touch data from the touch sensor 108 is monitored to determine if there is a sliding touch gesture detected. For example, a sliding touch gesture may be detected if there is a detected touch input that travels a distance greater than a defined distance threshold. Various techniques for detecting a sliding touch input are known and may be used at step 406.

If there is no sliding touch gesture detected, then no gesture is detected and the method 400 may end. If a sliding touch gesture is detected, the method 400 proceeds to optional step 407.

Optionally, at 407, the presence of any shear force input represented in the force data may be detected. For example, shear force input may be detected if the combined magnitude of the shear components (e.g., the x and y-components) of the force data (e.g., $|F_x|^2 + |F_y|^2$) exceeds a defined shear threshold. The shear threshold may be lower than the first magnitude threshold used in step 404, such that shear force input may be taken into account for processing the sliding gesture even if the magnitude of the force data is not large enough to satisfy the first magnitude threshold. Further, shear force input may be detected only if the direction of the shear force input correspond to the direction of the sliding touch input (e.g., if the sliding touch input is in the positive x-direction, the corresponding shear force input should also be in the positive x-direction). The magnitude of shear components of force data may be used for processing the sliding gesture at the following step 408.

At 408, the electronic device 100 processes a sliding gesture. The sliding gesture may be processed based on the context of the software application or the user interface being executed by the electronic device 100. If optional step 407 is performed, the sliding gesture may be processed based on the shear force input. The parameters for processing the sliding gesture may be dependent on the magnitude of the shear force input.

For example, if the electronic device 100 is executing an application for viewing an electronic book, the sliding gesture may be processed as input to navigate forward or backward through one or more pages of the electronic book (e.g., depending on the direction of the sliding gesture), and to display an animation of a page turn. If optional step 407 is not performed, the sliding gesture may be processed as input to navigate forward or backward a single page of the electronic book. If optional step 407 is performed, the magnitude of the shear components (e.g., combination of the x- and y-components) of the force data may be used to determine a parameter such as the number of pages to navigate forward or backward. For example, if the magnitude of the shear components exceed a first shear threshold, the electronic book may be navigated by a single page; if the magnitude of the shear components exceed a second shear threshold, the electronic book may be navigated by two pages; and so forth. Thus, force input may be used together with touch input, for controlling the electronic device 100. The sliding gesture may be processed in other ways, in the context of other software applications or user interfaces. For example, the sliding gesture may be processed as a scrolling input when viewing a document or webpage, among other possibilities (and the shear force input may optionally be used to control a parameter such as the speed of scrolling). The method 400 then proceeds to step 416, which will be described further below.

Returning to step 404, if there is a total force magnitude that is above the first magnitude threshold, the method 400 proceeds to step 408.

At 408, it is determined whether the force data represents force input at a corner location or an edge location of the electronic device 100. For example, if the force sensors 106 include one or more corner force sensors 106*a* separate from one or more edge sensors 106*b*, step 408 may be performed by determining whether the force data is from a corner force sensor 106*a* or from an edge force sensor 106*b*. If there is only one force sensor 106 or if the force sensors 106 are not located at corner and edge locations, other techniques may be used to determine the location of the force input (e.g., based on comparing the shear and normal components of the force input).

In some examples, the magnitude of the normal component (e.g., the calculated magnitude of the z-component, $|F_z|^2$) of the force data may be compared with the magnitude of the shear components (e.g., the combined magnitudes of the x and y-components, $|F_x|^2 + |F_y|^2$) of the force data. The force input may be determined to be from a corner location only if the normal component at the corner location is greater than the shear components at that location. Similarly, the force input may be determined to be from an edge location only if the normal component at the edge location is greater than the shear components at that location.

If the force input is determined to be from a corner location, the method 400 proceeds to step 412.

At 412, the electronic device 100 processes a folding gesture. The folding gesture may be processed based on the context of the software application or the user interface being executed by the electronic device 100. For example, if the electronic device 100 is executing an application for viewing an electronic book, the folding gesture may be processed as input to create or delete a bookmark for the current page (e.g., depending on whether a bookmark currently exists for the current page), and to display an animation of folding or unfolding a page. The folding gesture may be processed in other ways, in the context of other software applications or user interfaces. For example, the folding gesture may be processed as input to call up a menu of options, among other possibilities. The method 400 then proceeds to step 416, which will be described further below.

Returning to step 410, if the force input is determined to be from an edge location, the method 400 proceeds to step 414.

At 414, the electronic device 100 processes a flipping gesture. The flipping gesture may be processed based on the context of the software application or the user interface being executed by the electronic device 100. For example, if the electronic device 100 is executing an application for viewing an electronic book, the flipping gesture may be processed as input to navigate forward or backward through one or more pages (e.g., depending on the direction of the flipping gesture), and to display an animation of flipping through one or more pages. The flipping gesture may be processed in other ways, in the context of other software applications or user interfaces. For example, the flipping gesture may be processed as input to fast forward or rewind a video, or as a continuous scroll input when viewing a document or webpage, among other possibilities. The method 400 then proceeds to step 416.

Returning to step 410, in some examples, if the force input is determined to be from neither a corner location nor an edge location (e.g., if the force input is detected to be at a central location on the front surface of the electronic device 100), then no force-based gesture is detected and the method 400 may end.

At 416, haptic feedback is generated in accordance with the detected gesture. For example, the processing unit 202 may control the actuator 104 to generate vibrations (or other haptic feedback) using defined parameters (e.g., at a defined frequency, intensity and/or time duration) depending on the detected gesture. In some examples, the parameters used for generating the haptic feedback may depend on the magnitude of the force input. The generated haptic feedback may help to cause a user to experience a haptic illusion that is coherent with the detected gesture.

For example, if the sliding gesture is detected, the actuator 104 may be controlled to generate a sustained vibration as long as the sliding gesture is detected (e.g., as long as the touch input continues to move on the front surface of the electronic device 100).

In another example, if the folding gesture is detected, the actuator 104 may be controlled to generate a vibration for a defined time duration (e.g., several milliseconds).

In another example, if the flipping gesture is detected, the actuator 104 may be controlled to generate a sustained vibration as long as the flipping gesture is detected (e.g., as long as force input above the first magnitude threshold is sensed at an edge location). Further, if the force input exceeds a second magnitude threshold (that is higher than the first magnitude threshold used at step 404), the actuator 104 may be controlled to generate a vibration using a different set of parameters (e.g., having higher frequency, higher intensity and/or a vibration pattern) to emulate continuous page-flipping.

The parameters (e.g., frequency, intensity and/or time duration of vibration) of the generated haptic feedback may be proportional to the magnitude of the detected gesture. For example, a sliding gesture that travels a greater distance may result in generation of stronger vibrations than a sliding gesture that travels a shorter distance. In another example, the vibrations generated for a folding or flipping gesture may have an intensity proportional to the magnitude of the normal force sensed at the corner or edge location, respectively. The parameters of the generated haptic feedback may be controlled in a stepwise manner based on the magnitude of the force data. In some examples, the haptic feedback may be generated using a first set of parameters (e.g., a first frequency, first intensity and/or first time duration of vibration) when the force data exceeds the first magnitude threshold, and may be generated using a second set of parameters (e.g., a second frequency, second intensity and/or second time duration of vibration; possibly eliciting a stronger haptic illusion) when the force data exceeds a higher second magnitude threshold.

Some examples of haptic feedback have been described above. However, it should be understood that haptic feedback may be generated in a variety of ways, and may depend on the arrangement of one or more actuators 104 in the electronic device 100. For example, if the electronic device 100 includes actuators 104 located at different locations (e.g., at corner and edge locations), the actuator 104 that is closest to the location of the detected gesture (e.g., at the corner or edge location where the folding or flipping gesture, respectively, is detected) may be used to generate haptic feedback. For example, if actuators 104 are packaged together with respective force sensors 106 in haptic modules, the haptic feedback may be generated by activating the actuator 104 corresponding to the force sensor 106 that sensed the force gesture.

Further, a user may be able to customize the haptic feedback based on personal preferences. For example, a user may be able to control parameters (e.g., the frequency, intensity and/or time duration of vibrations) of the haptic feedback generated for each detected gesture.

Although step 416 is illustrated as following steps 408, 412 and 414, it should be understood that the haptic feedback may be generated concurrently with processing of the detected sliding, folding or flipping gesture, respectively. Thus, the processing of the sliding, folding or flipping gesture may be perceived by the user as being simultaneous with the tactile sensation of the haptic feedback, which may cause the user to experience a haptic illusion that is coherent with the gesture. The generation of haptic feedback may provide confirmation to the user that the gesture has been detected and the corresponding control input has been processed. By providing haptic feedback (which may be in addition to visual feedback in the form of an animation), eyes-free interactions with the electronic device 100 may be enabled.

The method 400 may be performed continuously (e.g., may return to step 402) to enable the electronic device 100 to monitor for and process gestures in real-time or near real-time.

As previously mentioned, the force-based gestures may be processed as different control inputs depending on the context of the software application being executed by the electronic device 100. Examples of how sliding, folding and flipping gestures are processed in the context of an electronic reader application are shown in FIGS. 3A-3C. Other examples are now discussed.

Figure 5A:
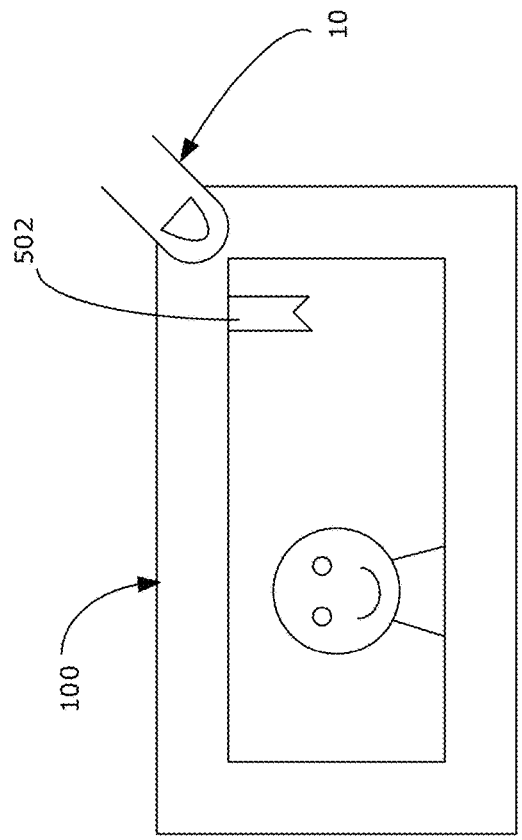
FIGS. 5A and 5B illustrate some example force-based gestures that may be used to control an electronic device in the context of a video playback application, in accordance with examples of the present disclosure.
Figure 5B:
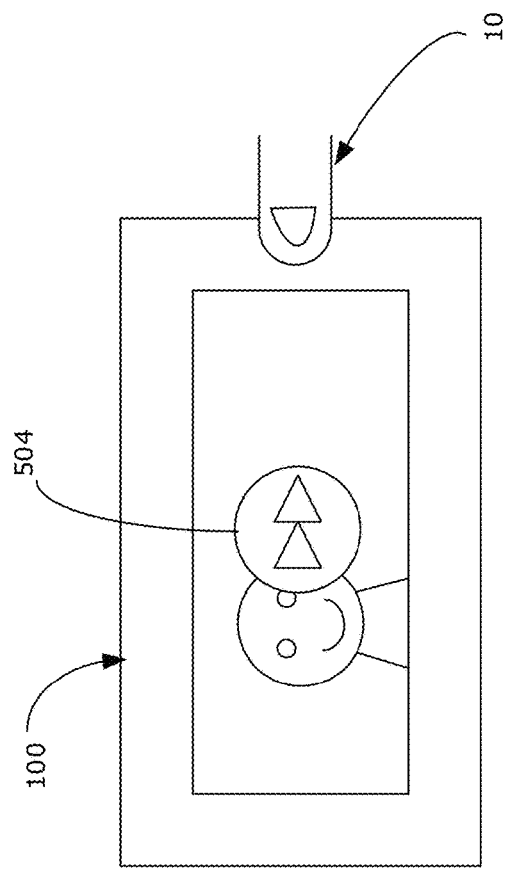

FIGS. 5A and 5B illustrate examples of how force-based gestures may be processed in the context of a video playback application. As shown, the electronic device 100 is currently executing a video playback application to play a video. In FIG. 5A, the user 10 performs a folding gesture by applying force input at a corner location of the electronic device 100. The folding gesture may be detected as described above. In the context of the video playback, the folding gesture may be processed as control input to create a bookmark or timestamp at the currently showing frame of the video. The electronic device 100 may display an animation 502 indicating that a bookmark or timestamp has been created. The electronic device 100 also generates haptic feedback (e.g., a vibration) indicating the folding gesture has been detected and processed, as discussed above.

In FIG. 5B, the user 10 performs a flipping gesture by applying force input at an edge location of the electronic device 100. The flipping gesture may be detected as described above. In the context of the video playback, the flipping gesture may be processed as control input to fast forward or rewind the video, depending on the direction and/or magnitude of the applied force. For example, if the flipping gesture is detected on the right edge of the electronic device 100 (as shown in FIG. 5B), the flipping gesture may be processed as a fast forward control input; and if the flipping gesture is detected on the left edge of the electronic device 100, the flipping gesture may be processed as a rewind control input. The speed of the fast forwarding or rewinding may be dependent on the magnitude of the force input. For example, the speed may be proportional to the magnitude of the force input, or the speed may be controlled in a stepwise fashion (e.g., a first speed may be used when the force input exceeds the first magnitude threshold, and a second faster speed may be used when the force input exceeds a higher second magnitude threshold). The electronic device 100 may display an animation 504 indicating that the video is being fast forwarded or rewound. The electronic device 100 also generates haptic feedback (e.g., a vibration) indicating the flipping gesture has been detected and processed, as discussed above. The fast forwarding or rewinding and the haptic feedback may be continued as long as the flipping gesture is detected (e.g., force input continues to be detected at the same edge location).

It should be noted that, although video playback has been described as an example, other playback applications (e.g., audio playback application, slide presentation viewer, etc.) may be controlled in a similar manner using force gestures.

Figure 6B:
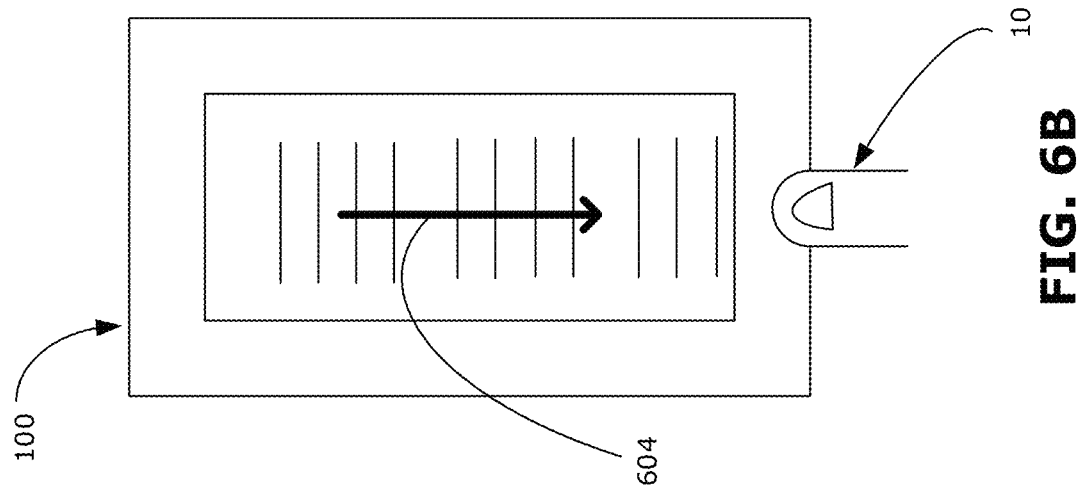
FIGS. 6A and 6B illustrate some example force-based gestures that may be used to control an electronic device in the context of a web browsing application, in accordance with examples of the present disclosure.
Figure 6A:
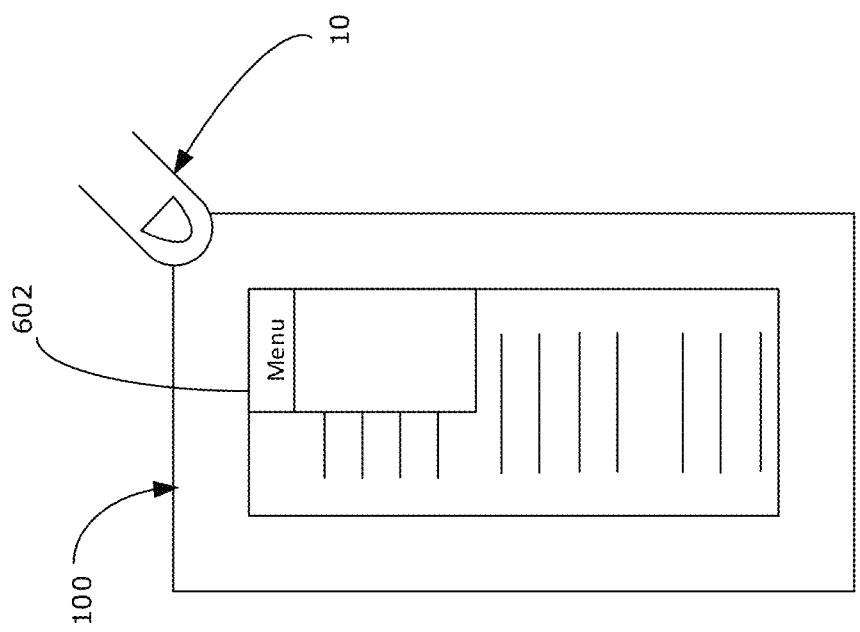

FIGS. 6A and 6B illustrate examples of how force-based gestures may be processed in the context of a web browsing application. As shown, the electronic device 100 is currently executing a web browsing application to view a webpage. In FIG. 6A, the user 10 performs a folding gesture by applying force input at a corner location of the electronic device 100. The folding gesture may be detected as described above. In the context of web browsing, the folding gesture may be processed as control input to open a menu of options. The electronic device 100 may display a menu 602 at or near the corner location where the folding gesture was detected. The electronic device 100 also generates haptic feedback (e.g., a vibration) indicating the folding gesture has been detected and processed, as discussed above.

In FIG. 6B, the user 10 performs a flipping gesture by applying force input at an edge location of the electronic device 100. The flipping gesture may be detected as described above. In the context of web browsing, the flipping gesture may be processed as control input to scroll up or scroll down the webpage, depending on the direction and/or magnitude of the applied force. For example, if the flipping gesture is detected on the bottom edge of the electronic device 100 (as shown in FIG. 6B), the flipping gesture may be processed as a scroll down control input (as indicated by the arrow 604 in FIG. 6B); and if the flipping gesture is detected on the top edge of the electronic device 100, the flipping gesture may be processed as a scroll up control input. The speed of the scrolling may be dependent on the magnitude of the force input. For example, the speed may be proportional to the magnitude of the force input, or the speed may be controlled in a stepwise fashion (e.g., a first speed may be used when the force input exceeds the first magnitude threshold, and a second faster speed may be used when the force input exceeds a higher second magnitude threshold). The electronic device 100 also generates haptic feedback (e.g., a vibration) indicating the flipping gesture has been detected and processed, as discussed above. The scrolling and the haptic feedback may be continued as long as the flipping gesture is detected (e.g., force input continues to be detected at the same edge location).

It should be noted that, although web browsing has been described as an example, other applications for viewing non-paginated information (e.g., email viewer, text viewer, etc.) may be controlled in a similar manner using force gestures.

The force-based gestures described herein may be used as control inputs in the context of other software applications, and the present disclosure is not intended to be limited to the specific examples described.

FIG. 7 shows an example in which the electronic device 100 is used together with a separate wearable device 150. The wearable device 150 may, for example, be a smartwatch, smart ring, or smart glasses, among other possibilities. The wearable device 150 includes one or more actuators to enable the wearable device 150 to generate haptic feedback (e.g., vibrations).

The electronic device 100 may communicate with the wearable device 150 to control the wearable device 150 to generate haptic feedback. For example, the electronic device 100 may control the wearable device 150 to generate haptic feedback (e.g., at step 416 described above) in addition to or in place of haptic feedback generated using the actuator 104 of the electronic device 100. In some examples, the electronic device 100 may control the wearable device 150 to generate haptic feedback to cause the user to experience haptic illusion even if the electronic device 100 itself does not include an actuator 104. In the example shown in FIG. 7, haptic feedback (e.g., vibrations, as indicated by zigzag lines in FIG. 7) is generated by both the electronic device 100 and by the wearable device 150, in response to detecting and processing a folding gesture.

The present disclosure has described examples of force-based gestures that may be used as control inputs to an electronic device, in particular an electronic device having a rigid display. The force-based gestures include sliding, folding, and flipping gestures. These gestures may be intuitive to a user because they mimic a user's physical interactions, such as typical interactions with a physical book. Each type of gesture may be processed in a manner that is dependent on the context of the software application being executed by the electronic device.

The force-based gestures described herein may be used together with existing touch gestures supported by typical electronic devices. In some examples, force-based gestures may enhance existing touch gestures (e.g., by enabling detection of shear force input to enhance a sliding touch gesture). Folding and flipping force gestures may be performed in a non-display area of the electronic device, to avoid interference with touch gestures that may be made on the touchscreen display.

The present disclosure also describes the use of haptic feedback that may cause a user to experience a haptic illusion that is coherent with the force gesture. This may cause the user to experience the illusion of actually sliding, folding or flipping pages of a physical book, for example. The use of haptic feedback may provide non-visual confirmation that a gesture has been detected, thus enabling eyes-free interactions.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable an electronic device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for processing gesture input at an electronic device, the method comprising:
   during execution of a playback application:
      monitoring force data from one or more force sensors to determine any force data exceeding a defined first magnitude threshold, the force data representing a force input to the electronic device;
      in response to determining force data from at least one force sensor exceeding the first magnitude threshold, determining an edge location or a corner location of the force input;
      processing the force input as a force gesture in accordance with the determined edge location or the determined corner location, the force gesture being processed as a particular gesture, wherein the particular gesture is a flipping gesture when the edge location is determined and the flipping gesture is processed as input to fast forward or rewind playback; and
      generating haptic feedback concurrently with processing the force gesture;
      wherein the haptic feedback is generated using a defined set of parameters including at least one of a frequency parameter, an intensity parameter or a time duration parameter, the haptic feedback being generated using parameters that are dependent on the particular gesture, that are dependent on a magnitude of the force data, and that are dependent on a parameter of the particular gesture, the haptic feedback being generated continuously for a duration of the flipping gesture.

2. The method of claim 1, further comprising:
   in response to determining absence of any force data exceeding the first magnitude threshold, monitoring touch data to determine a sliding touch input to the electronic device;

processing the sliding touch input and the force gesture together as a sliding gesture, a parameter of the sliding gesture being a distance traveled; and generating the haptic feedback concurrently with processing the sliding gesture;

wherein the haptic feedback is generated using parameters that are dependent on the distance traveled by the sliding gesture.

3. The method of claim 2, further comprising:

determining, from the monitored force data, shear force input exceeding a defined shear threshold; and processing the sliding gesture based on the shear force input.

4. The method of claim 1, wherein at least one parameter for generating the haptic feedback is proportional to the magnitude of the force data.

5. The method of claim 1, wherein the parameters for generating the haptic feedback is a first set of parameters in response to determining that the force data exceeds the first magnitude threshold, and wherein the parameters for generating the haptic feedback is a second set of parameters in response to determining that the force data exceeds a higher second magnitude threshold.

6. The method of claim 1, further comprising:

during execution of an electronic reader application:

the force gesture is processed as a folding gesture when the corner location is determined, the folding gesture being processed as input to create or remove a bookmark, and wherein the haptic feedback is generated at a location corresponding to a detected location of the force input; or the force gesture is processed as the flipping gesture when the edge location is determined, the flipping gesture being processed as input to navigate forward or backward through one or more pages, and wherein the haptic feedback is generated as a sustained vibration for the duration of the flipping gesture.

7. The method of claim 1, further comprising:

during execution of a viewer application:

the force gesture is processed as the flipping gesture when the edge location is determined, the flipping gesture being processed as input to scroll up or down, and wherein the haptic feedback is generated continuously for the duration of the flipping gesture.

8. An electronic device comprising:

a processing unit coupled to a memory storing machine-executable instructions thereon, wherein the instructions, when executed by the processing unit, cause the electronic device to:

during execution of a playback application:

monitor force data from one or more force sensors to determine any force data exceeding a defined first magnitude threshold, the force data representing a force input to the electronic device;

in response to determining force data from at least one force sensor exceeding the first magnitude threshold, determine an edge location or a corner location of the force input;

process the force input as a force gesture in accordance with the determined edge location or the determined corner location, the force gesture being processed as a particular gesture, wherein the particular gesture is a flipping gesture when the edge location is determined and the flipping gesture is processed as input to fast forward or rewind playback; and generate haptic feedback concurrently with processing the force gesture;

wherein the haptic feedback is generated using a defined set of parameters including at least one of a frequency parameter, an intensity parameter or a time duration parameter, the haptic feedback being generated using parameters that are dependent on the particular gesture, that are dependent on a magnitude of the force data, and that are dependent on a parameter of the particular gesture, the haptic feedback being generated continuously for a duration of the flipping gesture.

9. The electronic device of claim 8, wherein the instructions, when executed by the processing unit, further cause the electronic device to:

in response to determining absence of any force data exceeding the first magnitude threshold, monitor touch data to determine a sliding touch input to the electronic device;

determine, from the monitored force data, shear force input exceeding a defined shear threshold;

process the sliding touch input and the force gesture together as a sliding gesture based on the shear force input, a parameter of the sliding gesture being a distance traveled; and generate the haptic feedback concurrently with processing the sliding gesture;

wherein the haptic feedback is generated using parameters that are dependent on the distance traveled by the sliding gesture.

10. The electronic device of claim 8, wherein the parameters for generating the haptic feedback is a first set of parameters in response to determining that the force data exceeds the first magnitude threshold, and wherein the parameters for generating the haptic feedback is a second set of parameters in response to determining that the force data exceeds a higher second magnitude threshold.

11. The electronic device of claim 8, wherein the instructions, when executed by the processing unit, further cause the electronic device to:

during execution of an electronic reader application:

the force gesture is processed as a folding gesture when the corner location is determined, the folding gesture being processed as input to create to remove a bookmark, and wherein the haptic feedback is generated at a location corresponding to a detected location of the force input; or the force gesture is processed as the flipping gesture when the edge location is determined, the flipping gesture being processed as input to navigate forward or backward through one or more pages, and wherein the haptic feedback is generated as a sustained vibration for the duration of the flipping gesture.

12. The electronic device of claim 8, wherein the instructions, when executed by the processing unit, further cause the electronic device to:

during execution of a viewer application:

the force gesture is processed as the flipping gesture when the edge location is determined, the flipping gesture being processed as input to scroll up or down, and wherein the haptic feedback is generated continuously for the duration of the flipping gesture.

13. A non-transitory computer-readable medium having machine-executable instructions stored thereon, the instructions, when executed by a processing unit of an electronic device, cause the electronic device to:

during execution of a playback application:

monitor force data from one or more force sensors to determine any force data exceeding a defined first magnitude threshold, the force data representing a force input to the electronic device;

in response to determining force data from at least one force sensor exceeding the first magnitude threshold, determine an edge location or a corner location of the force input;

process the force input as a force gesture in accordance with the determined edge location or the determined corner location, the force gesture being processed as a particular gesture, wherein the particular gesture is a flipping gesture when the edge location is determined and the flipping gesture is processed as input to fast forward or rewind playback; and generate haptic feedback concurrently with processing the force gesture;

wherein the haptic feedback is generated using a defined set of parameters including at least one of a frequency parameter, an intensity parameter or a time duration parameter, the haptic feedback being generated using parameters that are dependent on the particular gesture, that are dependent on a magnitude of the force data, and that are dependent on a parameter of the particular gesture, the haptic feedback being generated continuously for a duration of the flipping gesture.

* * * * *